(12) United States Patent
Mayer et al.

(10) Patent No.: US 7,644,613 B2
(45) Date of Patent: Jan. 12, 2010

(54) FLOW DETECTOR DEVICE WITH SELF CHECK

(75) Inventors: Felix Mayer, Stäfa (CH); Mark Hornung, Männedorf (CH); Marc von Waldkirch, Zollikon (CH); Marcel Plüss, Wädenswil (CH)

(73) Assignee: Sensirion AG, Stafa (CH)

( * ) Notice: Subject to any disclaimer, the term of this patent is extended or adjusted under 35 U.S.C. 154(b) by 174 days.

(21) Appl. No.: 12/009,679

(22) Filed: Jan. 21, 2008

(65) Prior Publication Data

US 2008/0245145 A1  Oct. 9, 2008

(30) Foreign Application Priority Data

Feb. 28, 2007 (EP) .................. 007004103

(51) Int. Cl.
*G01F 1/68* (2006.01)

(52) U.S. Cl. .................................. 73/204.26

(58) Field of Classification Search ............. 73/204.26, 73/204.25, 204.15; 137/554
See application file for complete search history.

(56) References Cited

U.S. PATENT DOCUMENTS

| | | | |
|---|---|---|---|
| 4,501,145 A | | 2/1985 | Boegli et al. |
| 4,672,997 A | * | 6/1987 | Landis et al. ............... 137/554 |
| 5,230,245 A | | 7/1993 | Kamiunten et al. |
| 5,980,102 A | | 11/1999 | Stulen et al. |
| 6,035,711 A | | 3/2000 | Huijsing et al. |
| 6,209,402 B1 | | 4/2001 | Yamada |
| 6,349,596 B1 | | 2/2002 | Nakada et al. |
| 6,351,390 B1 | | 2/2002 | Mayer et al. |
| 6,550,324 B1 | | 4/2003 | Mayer et al. |
| 6,662,121 B1 | | 12/2003 | Oda et al. |
| 6,681,742 B1 | | 1/2004 | Hirayama et al. |
| 6,684,694 B2 | | 2/2004 | Fujiwara et al. |
| 6,763,710 B2 | | 7/2004 | Mayer et al. |
| 6,813,944 B2 | | 11/2004 | Mayer et al. |
| 6,888,358 B2 | | 5/2005 | Lechner et al. |
| 2002/0043104 A1 | * | 4/2002 | Lammerink ............... 73/204.15 |
| 2003/0115952 A1 | | 6/2003 | Mayer et al. |
| 2003/0132866 A1 | | 7/2003 | Haeberli et al. |
| 2004/0163464 A1 | * | 8/2004 | Nakada et al. ........... 73/204.26 |
| 2006/0144138 A1 | * | 7/2006 | Yamada et al. ........... 73/204.26 |
| 2007/0227242 A1 | | 10/2007 | Mayer et al. |
| 2007/0241093 A1 | | 10/2007 | von Waldkirch et al. |

FOREIGN PATENT DOCUMENTS

| | | |
|---|---|---|
| DE | 10129300 | 2/2002 |
| EP | 1065475 | 1/2001 |
| EP | 1873499 | 1/2008 |
| WO | 10118500 | 3/2001 |

OTHER PUBLICATIONS

F. Mayer et al., Proc. IEEE International Electron Devices Meeting (IEDM, 1997), pp. 895-898.

* cited by examiner

*Primary Examiner*—Jewel Thompson
(74) *Attorney, Agent, or Firm*—Cooper & Dunham LLP

(57) ABSTRACT

A thermal flow sensor is equipped with a self-test unit that monitors the device and generates a fault signal in the presence of a malfunction. The self-test unit can e.g. monitor the integrity of a membrane carrying the heater and temperature sensors, or it can monitor various operational parameters of the device, thereby increasing the safety of the device.

21 Claims, 2 Drawing Sheets

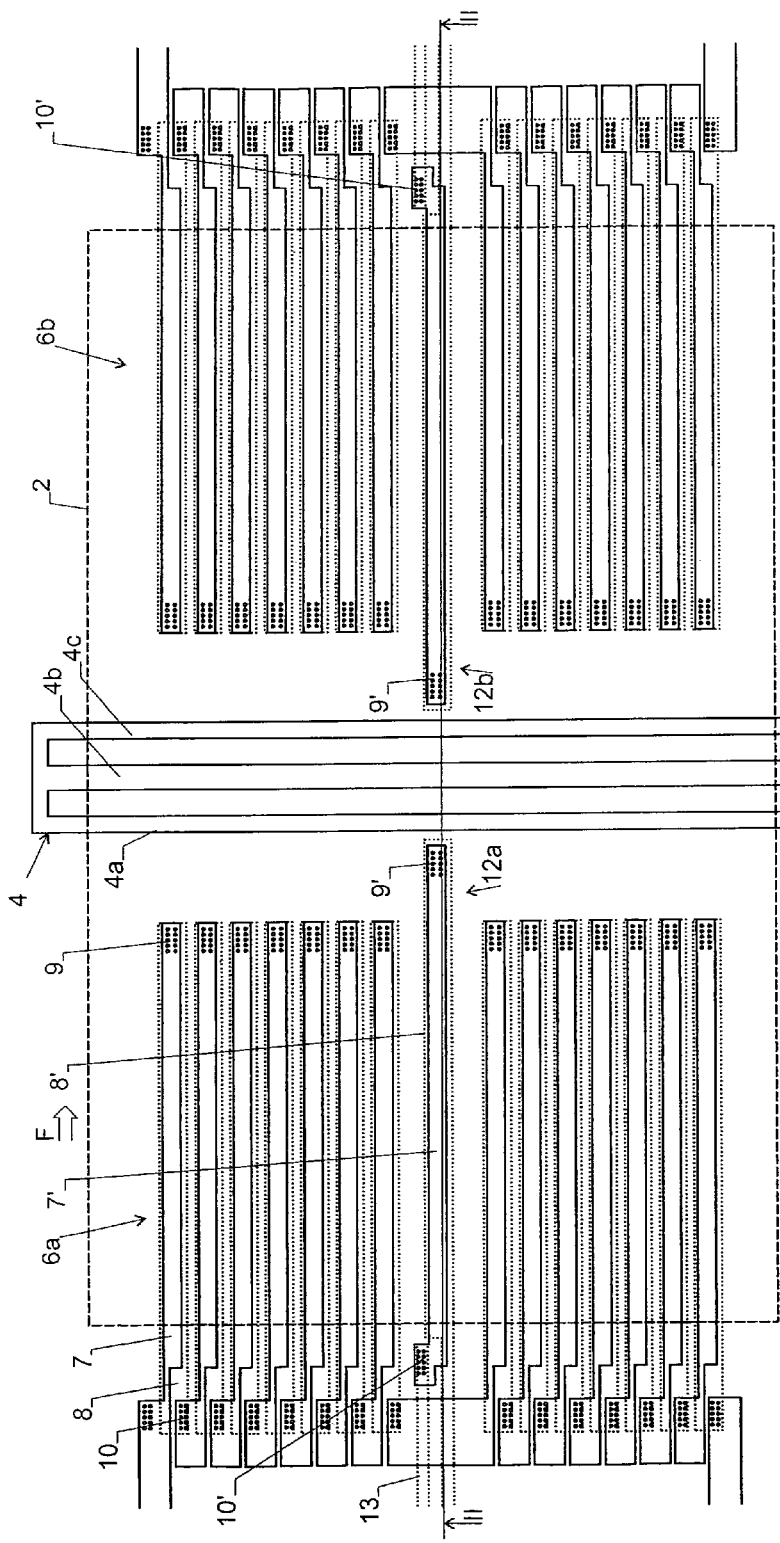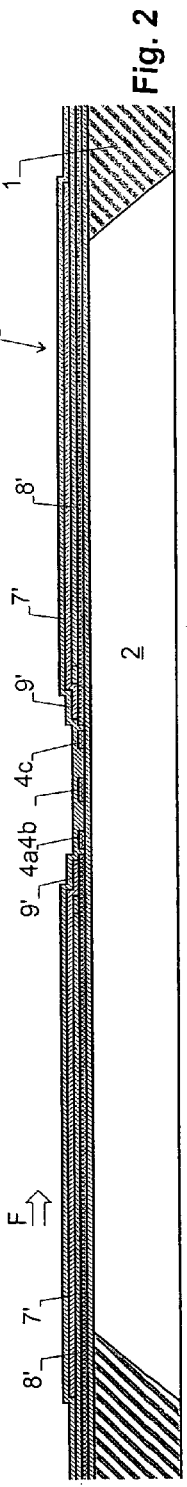

FLOW DETECTOR DEVICE WITH SELF CHECK

CROSS REFERENCE TO RELATED APPLICATIONS

This application claims the priority of European patent application 07004103.3, filed Feb. 28, 2007, the disclosure of which is incorporated herein by reference in its entirety.

BACKGROUND OF THE INVENTION

The invention relates to a device for measuring the flow of a fluid that has a heater and at least one temperature sensor integrated on a substrate. The device is adapted to measure the flow of the fluid from the signal measured by the temperature sensor(s). This type of flow sensor is e.g. described in US 2003/0115952.

Flow sensors are used in a variety of applications where reliability is of importance, such as applications in medicine as well as in the control of vehicles.

BRIEF SUMMARY OF THE INVENTION

Hence, it is a general object of the invention to provide a device of this type with improved reliability.

In a first aspect of the invention, the device comprises
a substrate,
a heater arranged on said substrate,
at least one sensing temperature sensor, which sensing temperature sensor is arranged on said substrate,
a control unit adapted to measure a flow of the fluid over said heater and said sensing temperature sensor from a flow-dependent heating of said sensing temperature sensor by said heater, and
a self-test unit adapted to detect a malfunction of said device and to generate a fault signal in the presence of the malfunction by detecting a deposition of contaminants on said membrane by measuring a parameter depending on a thermal conductivity along said membrane.

In a second aspect of the invention, the device comprises
a substrate,
a heater arranged on said substrate,
a first sensing temperature sensor and a second sensing temperature sensor being arranged upstream and downstream from said heater, which sensing temperature sensors are arranged on said substrate,
a control unit adapted to measure a flow of the fluid over said heater and said sensing temperature sensor from a flow-dependent heating of said sensing temperature sensor by said heater, and
a self-test unit adapted to detect a malfunction of said device and to generate a fault signal in the presence of the malfunction by checking a sum of temperatures measured by said first and said second sensing temperature sensors.

In a third aspect of the invention, the device comprises
a substrate,
a heater arranged on said substrate,
a first sensing temperature sensor and a second sensing temperature sensor being arranged upstream and downstream from said heater, which sensing temperature sensors are arranged on said substrate,
a control unit adapted to measure a flow of the fluid over said heater and said sensing temperature sensor from a flow-dependent heating of said sensing temperature sensor by said heater, and
a self-test unit adapted to detect a malfunction of said device and to generate a fault signal in the presence of the malfunction by monitoring a difference between the temperatures measured by said first and said second temperature sensors.

In a fourth aspect of the invention, the device comprises
a substrate,
a heater arranged on said substrate,
at least one sensing temperature sensor, which sensing temperature sensor is arranged on said substrate,
a control unit adapted to measure a flow of the fluid over said heater and said sensing temperature sensor from a flow-dependent heating of said sensing temperature sensor by said heater, and
a self-test unit integrated on said substrate and adapted to detect a malfunction of said device and to generate a fault signal in the presence of the malfunction.

In all aspects, the device is equipped with a self-test unit adapted to detect a malfunction and generating a fault signal in the presence of such a malfunction. A malfunction in this sense may e.g. be a complete breakdown of the device or a quantitative degradation thereof such that its signals fail to fulfill a given accuracy.

The fault signal can be used for monitoring the device.

The present invention is particularly advantageous for devices where the heater and temperature sensor(s) is/are arranged at least partially on a membrane for better thermal insulation. Since a membrane of this type, or the heater and temperature sensor arranged thereon, tend to rupture, the self-test unit can be adapted to detect such rupturing.

In a further advantageous embodiment, the self-test unit is adapted to measure at least one parameter of the device and comprises a store for storing a calibration value of this parameter, e.g. obtained in a measurement while calibrating the sensor. In normal operation, the self-test unit is adapted to repetitively measure the parameter and compare it to the calibration value. If the comparison fails, i.e. because the measured parameter lies outside a given range around the calibration value, the self-test unit flags a failure of the device. This technique e.g. allows to detect a gradual drift of the device.

The invention also relates to the self testing methods carried on by the self-test unit of the device.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 is a top view of a possible layout of the heater and temperature sensors of the device, FIG. 2 is a schematic sectional view along line II-II of FIG. 1, and FIG. 3 a block diagram of the device.

Figure 3:
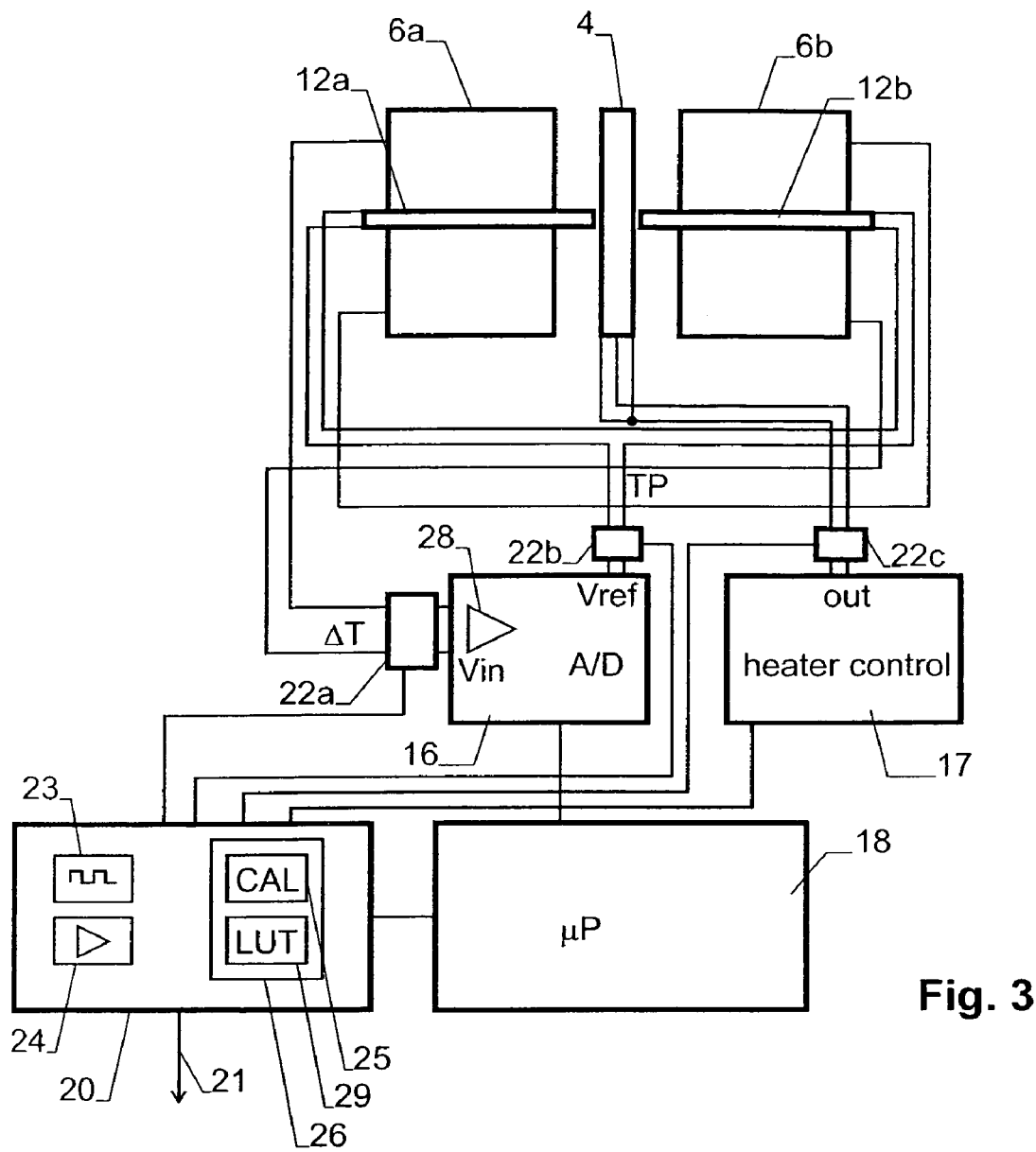

In a first step, we describe a possible layout of the heater and temperature sensors of the device by reference to FIGS. 1 and 2.

DETAILED DESCRIPTION OF THE INVENTION

The device of FIGS. 1 and 2 is designed as a semiconductor chip based on a silicon substrate 1, even though another semiconductor or dielectric substrate could be used as well, such as a glass substrate. A recess or opening 2 has been formed in substrate 1 by etching techniques and is spanned by a membrane 3. A heater 4 extends over membrane 3. In the embodiment of FIGS. 1 and 2, heater 4 is formed by three parallel conductors 4a, 4b, 4c, the two outer conductors 4a, 4c being arranged, electrically, in parallel, while the center conductor 4b (having double cross section) is in series to the conductors 4a, 4c.

Two sensing thermopiles 6a and 6b, each forming a "sensing temperature sensor" and consisting of a plurality of thermocouples in series, are arranged upstream and downstream of heater 4 (with the terms "upstream" and "downstream" being defined in respect to a flow direction F perpendicular to the longitudinal axis of the heater). Each sensing thermocouple consists of a metal bar 7 (shown in continuous lines in FIG. 1) formed in a metal layer of the integrated circuit as well as a polysilicon bar 8 (shown in dotted lines in FIG. 1) formed in the polysilicon layer of the integrated circuit. The metal and polysilicon bars 7, 8 of each thermocouple are interconnected at a first junction 9 on membrane 3. The polysilicon and metal bars 8, 7 of two neighboring thermocouples are interconnected at a second junction 10, which second junction 10 is not located on membrane 3, but over the bulk of substrate 1.

Instead of using polysilicon-metal thermopiles, it is also possible to use polysilicon-polysilicon thermopiles with polysilicon elements having differing dotations.

The basic principle of operation of such a device is e.g. described in US 2003/0115952. A flow along flow direction F causes the distribution of heat from heater 4 to become asymmetric, which creates a difference of temperature at the first junctions 9 of the two thermopiles 6a, 6b. At the same time, the second junctions 10 remain at substantially constant temperatures due to the heat exchange through the thermally conducting substrate 1. Hence, the difference of the voltages from the thermopiles 6a, 6b (or any value proportional thereto), which is called the "sensing signal" in the following, is substantially a measure of the temperature difference $T1-T2=\Delta T$ at the first junctions 9 upstream and downstream of heater 4. This temperature difference $\Delta T$ is a measure of the mass flow of the fluid.

As can be seen in FIGS. 1 and 2, two additional monitoring thermocouples 12a, 12b are provided on the device, each of which is located at the center of or elsewhere within one of the sensing thermopiles 6a, 6b. Each monitoring thermocouple 12a, 12b again consists of a metal bar 7' and a polysilicon bar 8' interconnected at a first junction 9' located over membrane 3. The first junctions 9' of the monitoring thermocouples 12a, 12b are located much closer to heater 4 than the first junctions 9 of the sensing thermopiles 6a, 6b and have a temperature substantially corresponding to the temperature in heater 4. The second ends of the metal bars 7' are e.g. connected to a polysilicon lead 13 at a second junction 10'. The second junctions 10' are, in the embodiment of FIGS. 1 and 2, located over the bulk of substrate 1.

Each monitoring thermocouple 12a, 12b therefore generates a voltage substantially equal to the temperature difference between substrate 1 and heater 4. The voltages from the monitoring thermocouples 12a, 12b are added to generate a monitoring signal TP.

An embodiment of the circuitry of the device is shown in FIG. 3. It comprises an A/D-converter 16 for digitizing the sensing signal $\Delta T$, a heater control 17 for controlling the current through heater 4 and a microcontroller 18 for processing the digitized sensing signal and controlling the device. Advantageously, the circuitry for all the elements 16, 17 and 18 is integrated on substrate 1, but it can also be formed at least in part by external components.

Basically, A/D-converter 16 can be any type, such as a successive-approximation ADC, a delta-encoded ADC or a sigma-delta converter. All such converter designs require a reference voltage Vref and generate a digitized value of the input signal normalized by Vref. The term "normalized", in this context, is to be understood such that the output value for a given input voltage depends linearly on the reciprocal value 1/Vref.

As can be seen in FIG. 3, the monitoring signal TP is fed to the reference input of A/D-converter 16 as a reference voltage Vref. As can be shown, this provides a more accurate and more linear signal than when using a constant voltage as reference voltage Vref.

Heater control 17 of the embodiment of FIG. 3 regulates the power dissipated by heater 4 to a constant value. Alternatively, it regulates the current through heater 4 to a constant value.

As shown in FIG. 3, the present device is further equipped with a self-test unit 20. The purpose of this unit is, as mentioned above, to detect a malfunction of the device and to generate a fault signal at an output 21 in the presence of such a malfunction. Advantageously, the components of self-test unit 20 are also integrated on substrate 1. Even though self-test unit 20 is shown as a separate rectangle in FIG. 3, it may also be implemented, partially or fully, by the software and hardware of microcontroller 18.

Self-test unit 20 can monitor the operation of the device in various ways, which will be described in the following. The different monitoring techniques can be used separately or in any arbitrary combination.

1. Membrane Break Testing:

Membrane 3 is a mechanically sensitive part that may break under stress. Hence, self-test unit 20 can monitor the integrity of membrane 3.

For example, self-test unit 20 can measure a parameter depending on the conductivity of an electrically conductive component extending at least partially over the membrane.

The component can e.g. be the any of the temperature sensors formed by the thermopiles or thermocouples 6a, 6b, 12a, 12b, or it can be heater 4. For monitoring these components, their terminals are connected to switching units 22a, 22b, 22c. The switching units 22a, 22b, 22c are controlled by self-test unit 20. In normal operation, they are set to connect the temperature sensors to A/D-converter 16 and heater 4 to heater control 17. For monitoring the operation of the device, self-test unit 20 can set them to connect a square wave generator 23 to one terminal of the component and the input of a voltage or current detector 24 to the other terminal of the component. If the component is functioning normally, detector 24 will detect the square wave generated by generator 23. If the component is broken, detector 24 will detect no signal or a weaker signal.

The component to be tested in this way may also be a conductor on membrane 3 other than the temperature sensors 6a, 6b, 12a, 12b or the heater 4, such as a metal line extending through membrane 3 especially provided for this purpose.

The component to be tested can also be an electrical strain gauge, whose resistance changes as a function of the strain in membrane 3. A break in membrane 3 will change the strain therein, thereby affecting the resistance of the strain gauge even if the break does not extend through the strain gauge itself.

The parameter of the component that is measured in this way can be compared to a "hard" threshold, e.g. to a threshold that is fixedly programmed into self-test unit 20. However, advantageously, a calibration value of the parameter is measured during a calibration of the device. This calibration value can be stored in a calibration memory 25 of a store 26 of self-test unit 20. When monitoring the device, the calibration value is compared to the actual parameter and, if the actual parameter lies outside a given range defined by the calibration value, a malfunction of the device is flagged.

2. Temperature Verification:

If the device is operating properly, the temperature at all temperature sensors 6a, 6b, 12a, 12b should rise when heater 4 is heated.

Hence, self-test unit 20 can monitor the integrity of the device by checking the temperature measured by any of the temperature sensors 6a, 6b, 12a, 12b while heater 4 is being heated. Examples are, for example:

2a) Test Signal TS=T1+T2

For example, the monitoring signal TP and/or a test signal TS derived from the sum of the signals from the first and the second sensing temperature sensors (i.e. the first and the second sensing thermopiles 6a, 6b) can be measured by means of A/D-converter 16, using a fixed voltage at the reference input Vref. The result of this measurement can e.g. be compared to a threshold stored in calibration memory 25, which was derived from a calibration measurement when the device was new. If the measured sum is lower than the threshold, e.g. due to physical damage or drift of the device, it must be concluded that heater 4 or the temperature sensors do not work properly, and a malfunction is flagged.

Advantageously, this malfunction-check is carried out under zero flow conditions, i.e. when the flow over the device is zero, because a strong flow will decrease the test signal TS and the monitoring signal TP. For example, self check device 20 can be adapted to carry out this test only if the absolute value of the sensing signal $\Delta T$ is below a given threshold.

2b) Comparing TS and TP

Also, the monitoring signal TP can be compared to any test signal TS derived from the first and second sensing temperature sensors (i.e. the first and the second sensing thermopiles 6a, 6b).

For example, the test signal TS can e.g. be the sum T1+T2 of the signals from the first and second sensing temperature sensor. When heater 4 is heated, this test signal as well as the monitoring signal TP will rise. If only one of them rises, or if the difference or ratio between the two falls outside a predefined range, an error can be flagged.

Advantageously, the ratio between the test signal TS and the monitoring signal TP can be calculated, e.g. by feeding the monitoring signal TP to input Vref of A/D-converter 16 while feeding the sensing signal to input Vin of A/D-converter 16.

2c) General Test Signals TS

The test signal TS can e.g. also be the difference T1−T2, i.e. the sensing signal $\Delta T$ mentioned above. Under zero-flow conditions, i.e. when the flow over the device is substantially zero, this test signal should be zero as well. A value of $\Delta T$ that exceeds a given range around zero during zero-flow conditions can be used to flag an error. Hence, this malfunction-check is carried out during zero-flow conditions.

The following table illustrates some of the possible types of test signals TS that can be used as a parameter for monitoring the integrity of the device, and examples how these test signals can be processed:

TS How to process

T1+T2 Compare TS to monitoring signal TP, e.g. by calculating the ratio TS:TP, or
  Compare TS to a calibration value under zero-flow conditions T1−T2 Compare to zero under zero-flow conditions T1 Compare T1 to T2 under zero-flow conditions, or
  compare T1 to a calibration value under zero-flow conditions T2 Compare T2 to T1 under zero-flow conditions, or
  compare T2 to a calibration value under zero-flow conditions TP Compare TP to a calibration value under zero-flow conditions 3. Correlation Analysis:

Some of the signals generated in the device depend on the flow of the fluid over the device. When the flow changes, the signals change as well. This provides an additional means for monitoring the device for a malfunction.

Generally, self-test unit 20 can measure a first and a second signal generated on the device, with both signals depending on the flow. Store 26 is used to store a lookup table 29 correlating the first and the second signal, and self-test unit 20 can compare the actually measured first and second signals by means of this lookup table.

Examples of signals that depend on the flow are:
the sum T1+T2,
the difference T1−T2,
temperature T1,
temperature T2,
the test signal TP,
the current through heater 4 for a fixed applied voltage,
the voltage over heater 4 for a fixed current,
the power dissipation of heater 4 to achieve a fixed heater temperature,
the temperature of heater 4 under constant power dissipation.

Any independent pair of these signals, or, equivalently, any independent pair of parameters derived from these signals, can be used for correlation analysis.

To use such a correlation analysis, a calibration measurement can be carried out, where the values of both signals are stored in lookup table 29 for different flow values. During normal operation, for testing the device, both signals are measured as values s1 and s2. Then, value s1 can be fed to lookup table 29 for obtaining an expected value s2'. The expected value s2' is compared to the actually measured value s2. If the absolute difference |s2−s2'| falls outside a given threshold, a malfunction is flagged.

Particularly advantageous pairs signals for this purpose are
T1+T2 and TP or
T1+T2 and T1−T2 or
T1−T2 and TP.

4. Testing Other Circuit Parts of the Device:

Self-test unit 20 can test any of the circuit parts of the device. For example, A/D-converter 16 will generally comprise an integrated amplifier 28 and self-test unit 20 can test its amplification. For example, a known voltage can be applied to the input of amplifier 28 and the output signal of A/D-converter 16 is recorded. Then, the same voltage is applied after amplifier 28, while electrically disconnecting amplifier 28, and the output signal of A/D-converter 16 is compared the previously recorded signal, which allows to determine the amplification factor of amplifier 28 and check the same against an allowable range.

The output voltage of heater control 17 can be fed to input Vin of A/D-converter 16, with a fixed reference voltage applied to input Vref. This allows to monitor the operation of heater control 17.

The current fed through heater 4 can be measured by measuring a voltage drop over a reference resistor. This allows to monitor the operation of heater control 17 as well as the integrity of heater 4.

5. Thermal Conductivity of Membrane 3

Another important characteristic of the device that can be monitored is the thermal conductivity along membrane 3 or any parameter depending on the same. The term "thermal conductivity along membrane 3" expresses the thermal conductivity for heat flowing parallel to and along membrane 3.

Since a change of the thermal conductivity along membrane 3 affects the flow measurements, EP 1 065 475 suggests to correct the flow values using a measurement of the thermal conductivity. Here, it is suggested to use the thermal conductivity for flagging a device malfunction.

A parameter depending on the thermal conductivity along membrane 3 can e.g. be measured by an additional temperature sensor as described in EP 1 065 475, the disclosure of which is incorporated herein by reference. A calibration value of this parameter can be stored in calibration memory 25. To check the integrity of the device, the parameter is measured and compared to the calibration value stored in calibration memory 25. A malfunction is flagged if the values differ by more than a given threshold value.

6. Other Self Testing Techniques:

As has been mentioned under the section "membrane break testing", self-test unit 20 can measure a parameter depending on the conductivity of an electrically conductive component extending at least partially over the membrane. Alternatively or in addition thereto, self-test unit 20 can measure the same type of parameter of a conductive component anywhere on the device, not necessarily on membrane 3. When the parameter is found to fall outside an allowable range, a malfunction is flagged. This e.g. allows to detect a drift due to aging of the electrical components of the device.

If the sensing temperature sensors are thermopiles as shown, self-test unit 20 can use the Peltier effect for a further monitoring technique. To do so, self-test unit 20 is adapted to send a current through one of the sensing temperature sensors, thereby generating a temperature drop over the same. This temperature drop will induce a signal in the other sensing temperature sensor, which can be detected by self-test unit 20. If no such signal is observed or if the signal does not fall within an expected range, a malfunction is flagged.

In general, self-test unit 20 can monitor any parameter of the device. Advantageously, the parameter is compared to a calibration value stored in calibration memory 25 of store 26. A comparison between the actually measured parameter and the calibration value (e.g. by checking if the actually measured parameter falls within a certain range around the calibration value) allows to detect a malfunction.

7. Further Notes:

Advantageously, self-test unit 20 checks for a malfunction of the device repetitively and automatically, e.g. at regular intervals or prior or after each flow measurement.

The embodiments shown so far use thermocouples or thermopiles as sensing temperature sensors and monitoring temperature sensors. Alternatively, other types of temperature sensors can be used, such as resistive temperature sensors.

Even though detector 24 has been drawn as a separate component of self-test unit 20, it can e.g. also be formed by A/D-converter 16.

While there are shown and described presently preferred embodiments of the invention, it is to be distinctly understood that the invention is not limited thereto but may be otherwise variously embodied and practised within the scope of the following claims.

The invention claimed is:

1. A device for measuring the flow of a fluid comprising
   a substrate a membrane arranged over a recess or opening over said substrate,
   a heater arranged on said substrate,
   at least one sensing temperature sensor, which sensing temperature sensor is arranged on said substrate, wherein said heater and said at least one sensing temperature sensor are arranged at least partially on said membrane
   a control unit adapted to measure a flow of the fluid over said heater and said sensing temperature sensor from a flow-dependent heating of said sensing temperature sensor by said heater, and
   a self-test unit adapted to detect a malfunction of said device and to generate a fault signal in the presence of the malfunction by detecting a deposition of contaminants on said membrane by measuring a parameter depending on a thermal conductivity along said membrane.

2. A device for measuring the flow of a fluid comprising
   a substrate,
   a heater arranged on said substrate,
   a first sensing temperature sensor and a second sensing temperature sensor being arranged upstream and downstream from said heater, which sensing temperature sensors are arranged on said substrate,
   a control unit adapted to measure a flow of the fluid over said heater and said sensing temperature sensor from a flow-dependent heating of said sensing temperature sensor by said heater, and
   a self-test unit adapted to detect a malfunction of said device and to generate a fault signal in the presence of the malfunction by checking a sum of temperatures measured by said first and said second sensing temperature sensors.

3. The device of claim 2 wherein said self-test unit is adapted to compare said sum to a threshold value.

4. The device of claim 2 further comprising a first and a second monitoring temperature sensor being arranged upstream and downstream from said heater in addition to said first and second sensing temperature sensors, wherein said self-test unit is adapted to compare a test signal derived from said first and said second sensing temperature sensors to a monitoring signal derived from said first and second monitoring temperature sensors.

5. The device of claim 4 wherein said self-test unit is adapted to calculate a ratio between said test signal and said monitoring signal.

6. The device of claim 2 wherein said first and said second sensing temperature sensors are thermopiles, wherein said self-test unit is adapted to send a current through one of the sensing temperature sensors, thereby generating a temperature drop over said one of said sensing temperature sensors, and to detect said temperature drop by means of the other sensing temperature sensor.

7. The device of claim 2 wherein said self-test unit is adapted to test said sum if an absolute value of a difference between the temperatures measured by said first and said second sensing temperature sensors is below a given threshold.

8. A device for measuring the flow of a fluid comprising
   a substrate,
   a heater arranged on said substrate,
   a first sensing temperature sensor and a second sensing temperature sensor being arranged upstream and downstream from said heater, which sensing temperature sensors are arranged on said substrate,
   a control unit adapted to measure a flow of the fluid over said heater and said sensing temperature sensor from a flow-dependent heating of said sensing temperature sensor by said heater, and
   a self-test unit adapted to detect a malfunction of said device and to generate a fault signal in the presence of the malfunction by monitoring a difference between the temperatures measured by said first and said second temperature sensors.

9. The device of claim 8 wherein said self-test unit is adapted to generate said fault signal if said difference exceed a given range around zero during zero-flow conditions.

10. A device for measuring the flow of a fluid comprising
a substrate,
a heater arranged on said substrate,
at least one sensing temperature sensor, which sensing temperature sensor is arranged on said substrate,
a control unit adapted to measure a flow of the fluid over said heater and said sensing temperature sensor from a flow-dependent heating of said sensing temperature sensor by said heater, and
a self-test unit integrated on said substrate and adapted to detect a malfunction of said device and to generate a fault signal in the presence of the malfunction.

11. The device of claim 10 further comprising a memory for storing a calibration value of said parameter, wherein said self-test unit is adapted to flag said malfunction if said parameter and said calibration value differ by more than a given threshold value.

12. The device of claim 10 further comprising a membrane arranged over a recess or opening in said substrate, wherein said heater and said at least one sensing temperature sensor are arranged at least partially on said membrane.

13. The device of claim 12 wherein said self-test unit is adapted to monitor an integrity of said membrane.

14. The device of claim 10 wherein said self-test unit is adapted to measure a parameter depending on a conductivity of an electrically conductive component on said device.

15. The device of claim 14 wherein said component is said heater or said sensing temperature sensor.

16. The device claim 10 wherein said self-test unit is adapted to check a temperature measured by said sensing temperature sensor.

17. The device of claim 10 further comprising an amplifier integrated on said substrate, wherein said self-test unit is adapted to monitor an amplification of said amplifier.

18. The device of claim 10 wherein said self-test unit is adapted to monitor a voltage over or a current through said heater.

19. The device of claim 10 wherein said self-test unit is adapted to repetitively and automatically detect a malfunction of said device.

20. The device of claim 10 wherein said self-test unit is adapted to measure a parameter of said device and comprises a store for storing a calibration value of said parameter, wherein said self-test unit is adapted to repetitively measure said parameter and compare said parameter to said calibration value.

21. The device of claim 10 wherein said self-test unit is adapted to measure a first and a second signal generated on said device and depending on said flow, wherein said store comprises a lookup-table correlating said first and said second signal, wherein said self-test unit is adapted to repetitively measure said first and said second signal and to compare said first and said second signal by means of said lookup-table.

* * * * *